INVENTOR
ROBERT G. FRANK

ATTORNEYS

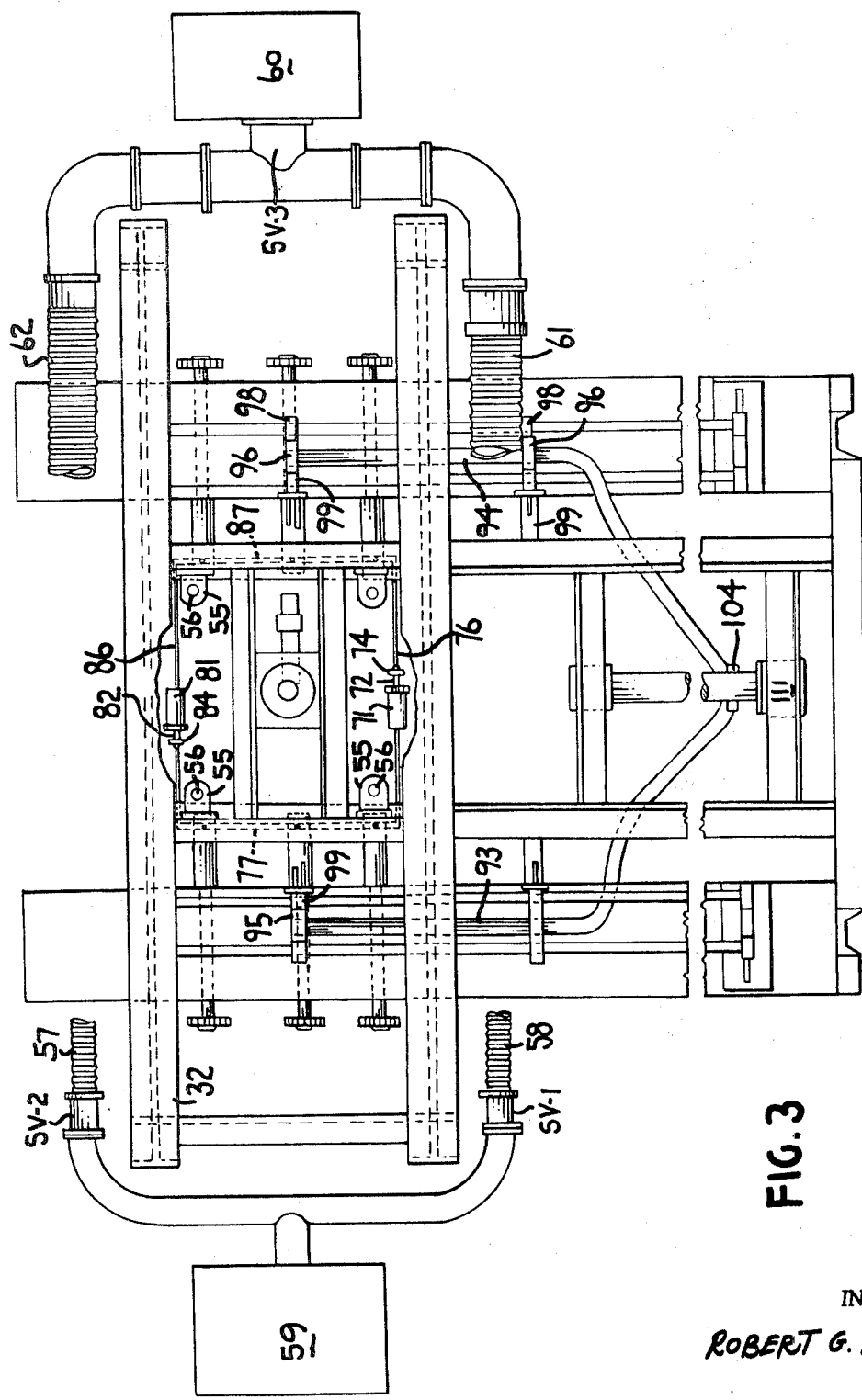

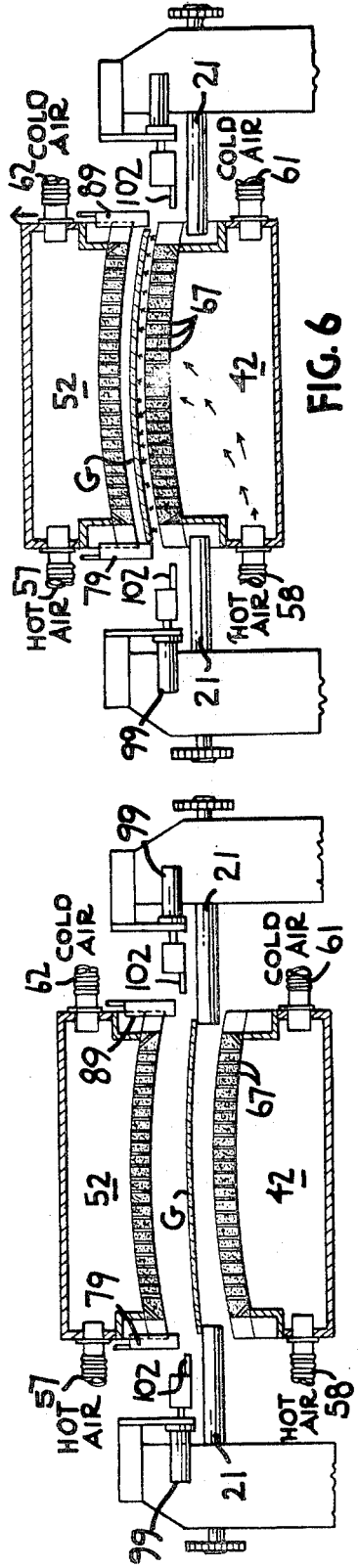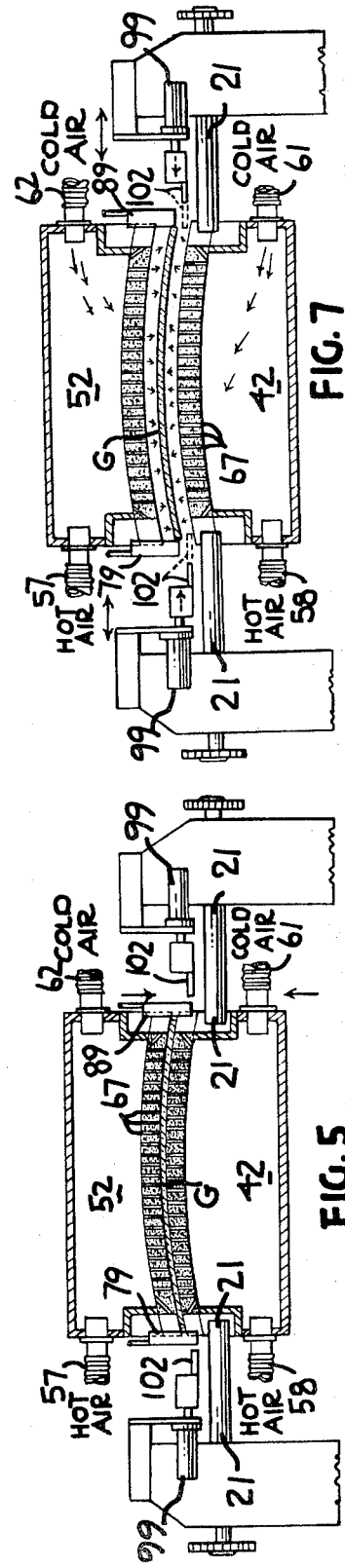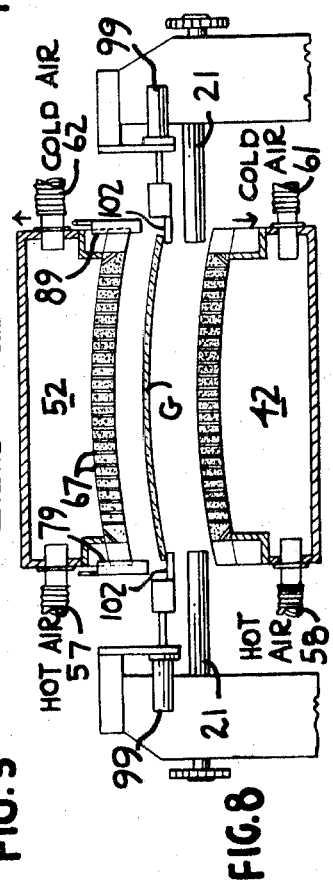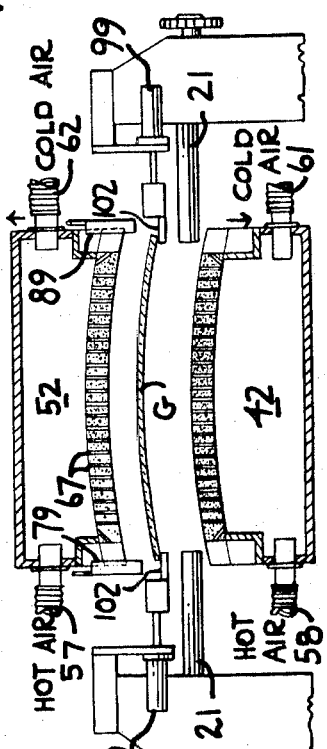

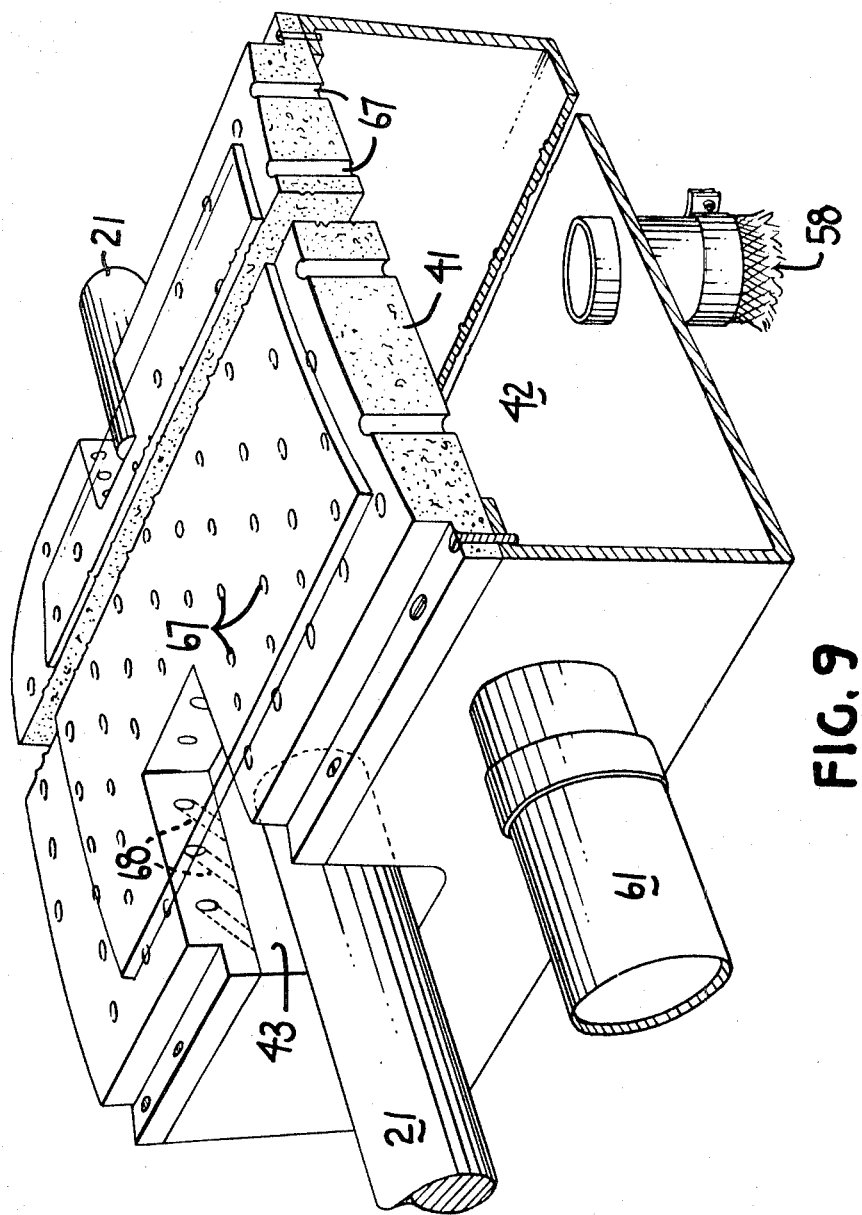

United States Patent Office 3,573,022
Patented Mar. 30, 1971

3,573,022
METHOD AND APPARATUS FOR SHAPING
GLASS SHEETS
Robert G. Frank, Tarentum, Pa., assignor to
PPG Industries, Inc., Pittsburgh, Pa.
Filed Mar. 11, 1968, Ser. No. 711,946
Int. Cl. C03b 23/02
U.S. Cl. 65—104                                    17 Claims

ABSTRACT OF THE DISCLOSURE

Glass sheets are shaped between press shaping molds having foraminous shaping surfaces. Heated gas and cooled gas are applied through the foramina of the shaping surfaces to separate the sheet from a foraminous surface in contact therewith and to cool the glass sheet respectivity. Reciprocating members engage the edges of the sheet to reciprocate the sheet in a generally horizontal direction until the glass sheet is no longer in a deformable state.

---

The present invention relates to bending glass sheets, and particularly relates to an improvement in shaping glass sheets by a press bending operation.

In a typical press bending operation, a series of glass sheets are conveyed through a furnace at a rate of speed that is correlated with the amount of heat supplied in the furnace to raise the temperature of each sheet of glass to its deformation temperature. When the leading sheet of glass in this series attains the desired temperature, it leaves the furnace and enters a shaping station. There, the heat-softened glass is press bent to a desired curvature between complemental shaping surfaces formed on the inner faces of a pair of contoured shaping molds. The glass sheets are then chilled as rapidly as possible if it is desired to temper the bent sheets after they are shaped.

In recent years, curved glass sheets have found increasing use as face plates for television tubes and as windows for automotive vehicles. The demand for these products has necessitated the development of mass production techniques to produce large quantities of curved glass sheets with a minimum of manual labor. The present invention provides a commercially practical mass production operation for producing curved glass sheets having very close dimensional tolerances throughout their entire extent, acceptable optical properties and uniform curvature from sheet to sheet.

Apparatus used to perform the above method usually comprises a pair of contoured shaping molds having foraminous shaping surfaces conforming to the shape desired for the opposite major surfaces of the bent glass sheet. According to the present invention, as least one of the molds comprises a chamber having a foraminous contoured wall conforming to the shape desired for a major surface of the glass sheet after bending. In order to avoid establishing a pattern of iridescence in the glass resulting from its non-uniform chilling immediately after its shaping, the present invention suggests reciprocating the glass sheet relative to the mold foramina during its quenching immediately following the press bending operation.

Apparatus for performing the present invention comprises a frame bridging a shaping mold and having glass edge engaging fingers extending through notches in the mold to beyond the mold. The fingers are spaced from one another a distance slightly greater than the corresponding dimension of the glass sheet.

Means is provided for reciprocating the frame and its glass engaging fingers at a frequency and displacement that is correlated with the arrangement of the apertures in the shaping mold so that the glass movement is sufficient in both amplitude and frequency to avoid establishing the iridescent patterns resulting from chilling the glass through spaced apertures without providing relative movement. Control means is also provided to control the program of reciprocating the frame and the glass engaging fingers with the application of cold fluid against the major surfaces of the press bent glass sheet so that both operations take place simultaneously.

According to a particular embodiment of the present invention, the mold opposite the first mold comprises a second chamber having a foraminous contoured wall conforming to the shape desired for the opposite major surface of the glass sheet after bending. Both mold chambers have operatively connected thereto fluid supply means for introducing relatively cold fluid to each chamber for exhaust through its foraminous wall. The program control means operates for both molds so that the introduction of cold fluid takes place in unison into the two chambers as well as simultaneously with the reciprocation of the glass engaging fingers.

One of the molds has an outer wall of concave configuration. The other mold has an outer wall contoured to a convex configuration. It is usually desirable to apply fluid through only one of said walls immediately after bending the glass sheet to help disengage the sheet from the molds before applying the quenching fluid against both surfaces of the bent glass sheet. The present invention optionally includes means to control the selective application of fluid to one side only of the bent glass to help disengage it from the mold.

Means for providing relative movement of the foraminous contoured walls between a closed position and a retracted position is provided in an illustrative embodiment of the present invention. In addition, when desired, means responsive to the relative movement of the contoured walls toward a retracted position initiates the introduction of the fluid through the mold having a convex outer wall to help separate the bent glass from the convex wall. Immediately thereafter, relatively cold fluid is rapidly introduced into both mold chambers to chill both bent glass surfaces.

Relative movement between a glass sheet and opposing molds having glass quenching apertures in planes parallel to the major glass surfaces lessens iridescent patterns resulting from non-uniform cooling of the glass sheet. The prior art moved the molds to perform such relative movement. Since molds are usually very heavy, powerful motors and accessory motive equipment are used to reciprocate the apertured molds. Furthermore, motive equipment reciprocating the molds at a rapid enough frequency to avoid an iridescent pattern establishes vibration that is very uncomfortable for personnel tending the equipment.

The reciprocatory motion imparting equipment required for such heavy equipment requires a large initial capital investment. Such massive equipment is likely to break down frequently. Much production time is lost repairing the expensive equipment. In addition, an inventory of relatively expensive parts must be kept.

The present invention suggests moving the glass sheet rather than the molds in a two-and-fro motion after press bending. The motion imparting equipment needed to move the light, bent glass sheet relative to the mold apertures is very light, thus enabling it to respond rapidly to actuation and deactivation and to reciprocate at a sufficient frequency and amplitude to avoid establishing the iridescent pattern.

According to an illustrative embodiment, the motion imparting means comprises glass edge engaging fingers that contact alternate opposite glass edges to displace the glass sheet across the space between the retracted molds. Since the glass floats, it is free to move in an arcuate plane in substantially fixed spatial relation between the molds. Mold moving apparatus is not capable of maintaining a fixed space between the glass and the molds.

A particular embodiment of the present invention will now be described in order to provide an illustrative example of the present invention. In the drawings which form part of the description, and where like reference numbers are applied to like structural elements:

FIG. 3 is a fragmentary plan view of a portion of the apparatus shown in FIGS. 1 and 2 with parts omitted to show other parts more clearly;

FIGS. 4 through 8 are schematic views showing the relative positions of various moving elements forming part of an illustrative embodiment of the present invention taken at different stages of a press bending operation;

FIG. 9 is a fragmentary, perspective view of a portion of the lower shaping mold used for press bending glass sheets with certain parts removed to show other parts in detail.

Figure 1:
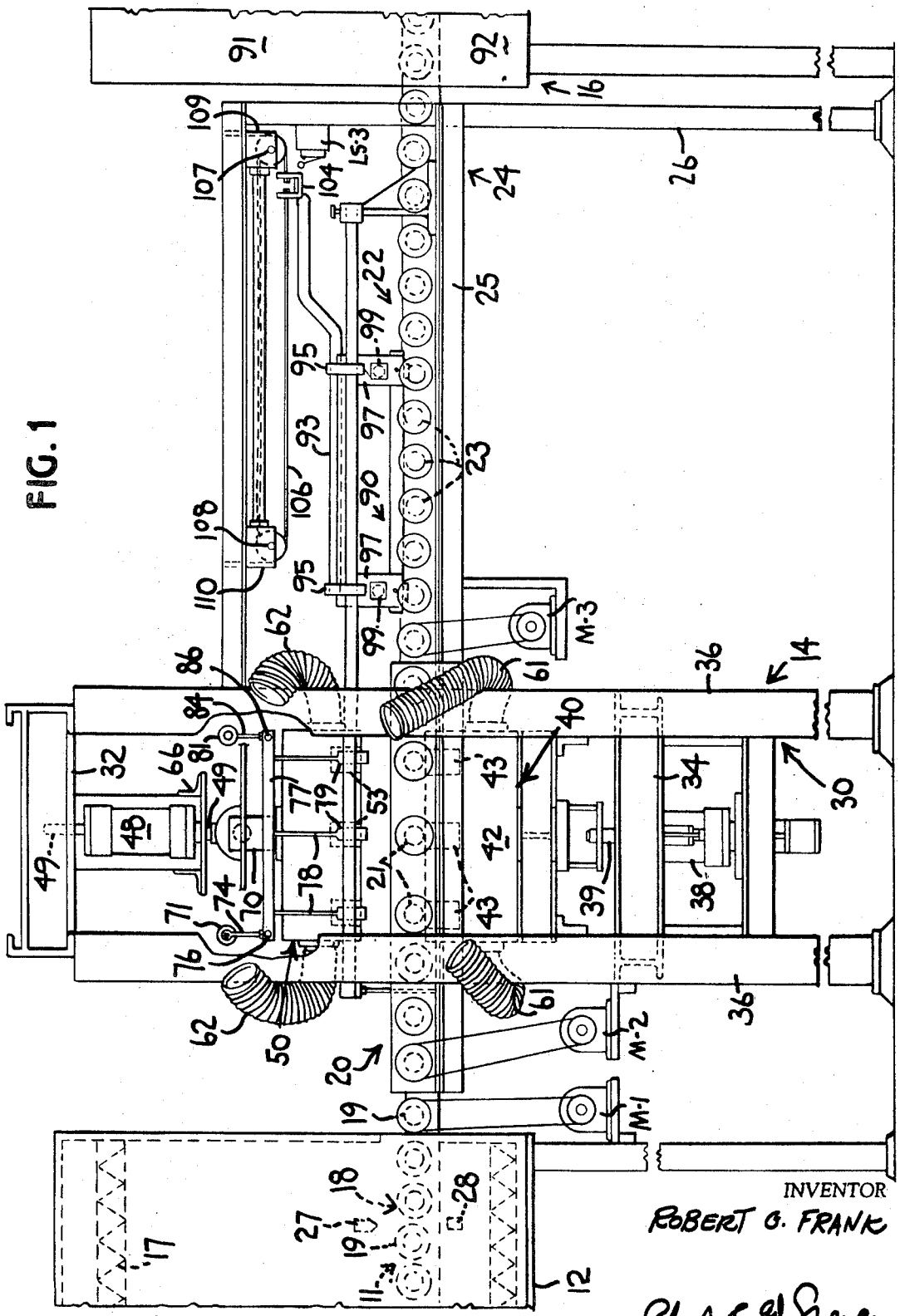
FIG. 1 is a fragmentary longitudinal side elevation of a press bending apparatus incorporating the novel features of the present invention.
Figure 2:
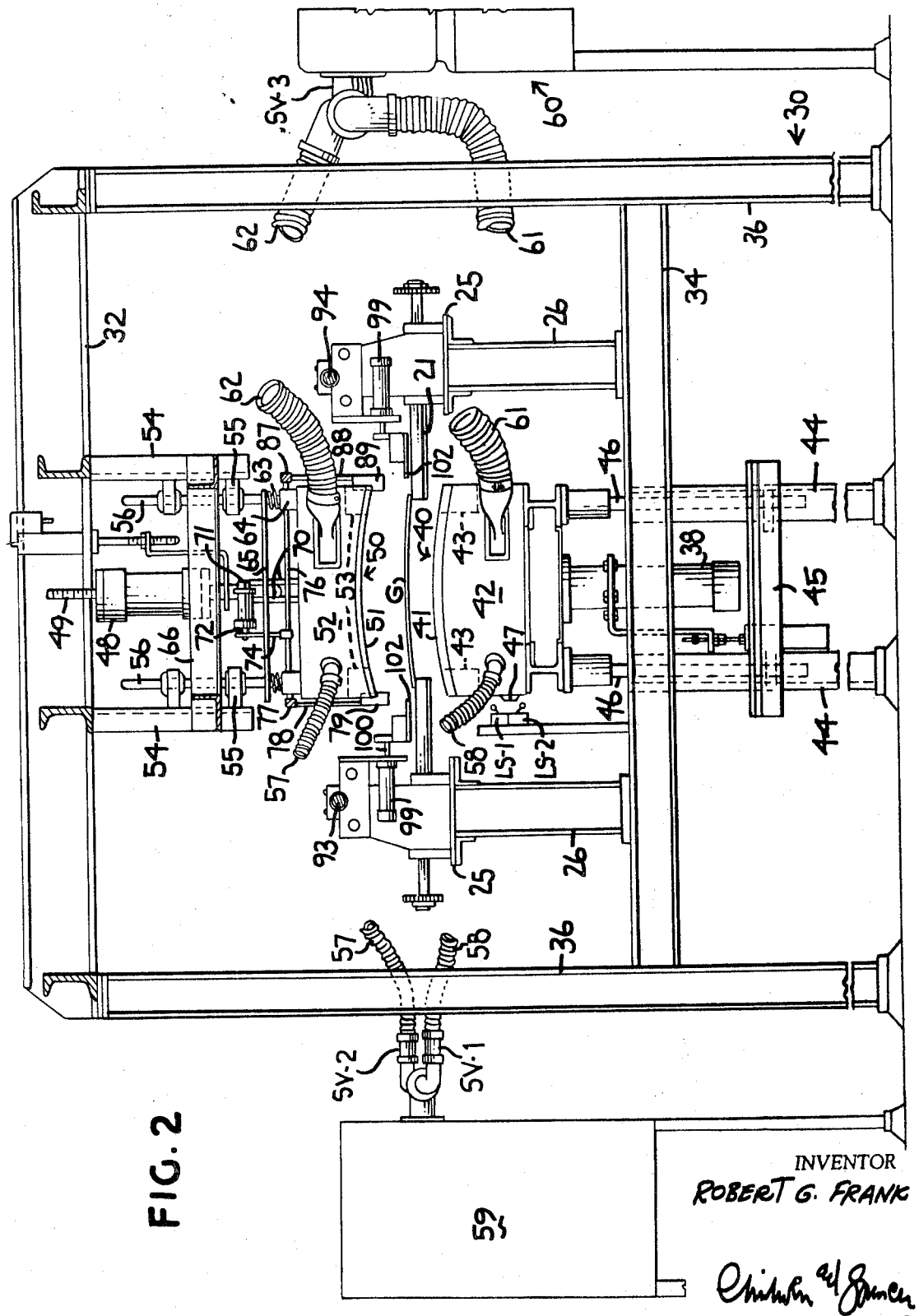
FIG. 2 is a schematic view transverse to that of FIG. 1 of selected portions of the press bending apparatus of the present invention.
Figure 10:
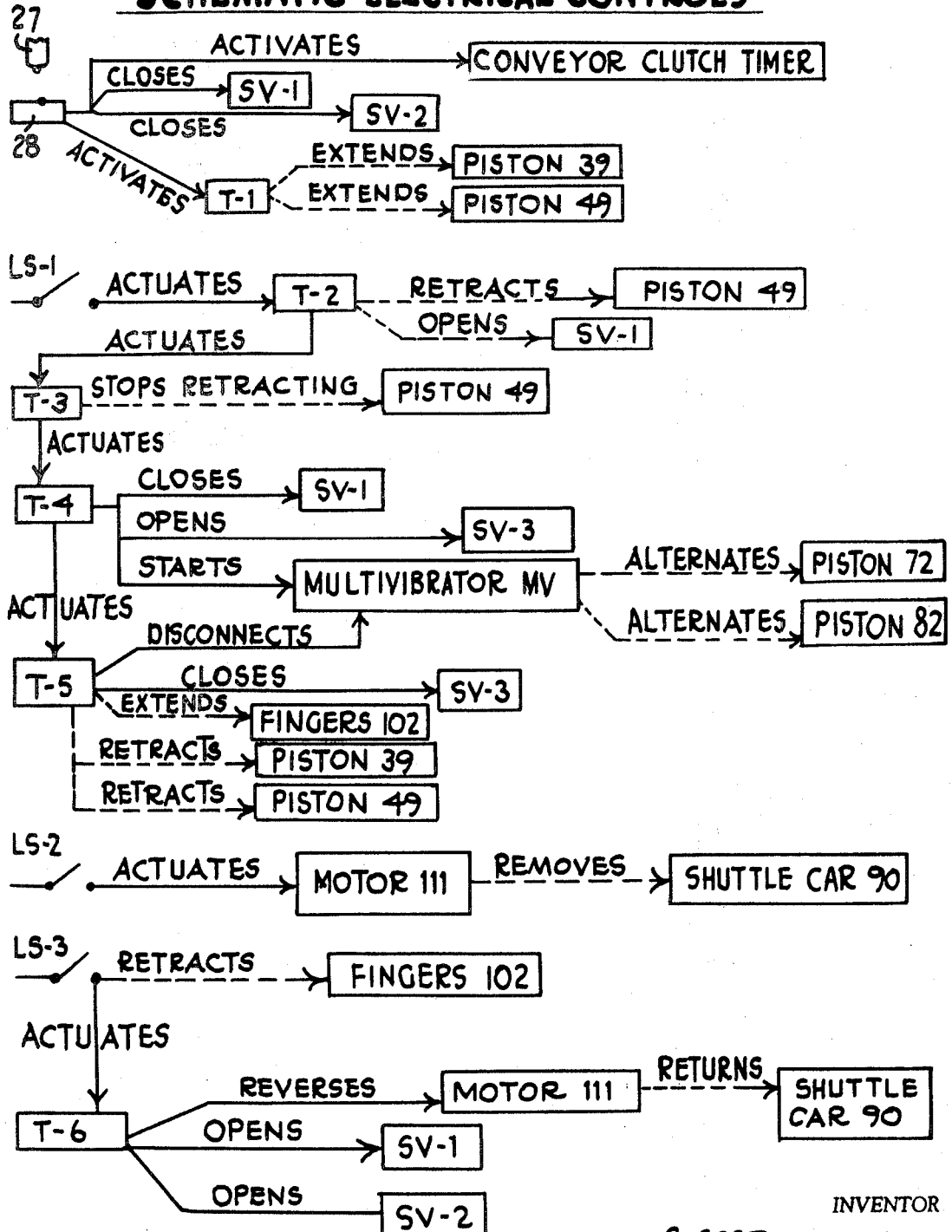
FIG. 10 is a schematic electrical circuit diagram explaining the sequential operation of the above illustrative embodiment of the invention.

Referring to the drawings, a typical apparatus illustrating the present invention comprises a conveyor system 11 which extends horizontally through a furnace 12, a shaping and quenching station 14, and additional cooling apparatus 16. The three elements traversed by the conveyor system are disposed in end to end relationship between a loading station (not shown) at the front end of the conveyor system 11 and an unloading station (also not shown) at the other end of the conveyor system.

The furnace 12 is of tunnel-type configuration and has heating elements 17 disposed in rows and columns to radiate heat downward and upward toward a first conveyor section 18 of the conveyor system 11. The first conveyor section 18 comprises a plurality of longitudinally spaced horizontally extending continuous conveyor rolls 19 disposed for rotation about transverse axes throughout the loading station and the length of the furnace 12. A motor M-1 drives the rolls 19 in unison at a uniform rate of rotation which is preselected to coordinate with the amount of heat provided by the heaters 17 in the furnace 12 so as to irradiate glass sheets conveyed through the furnace to heat the sheets to a temperature such that when the leading sheet leaves the furnace it is at a deformation temperature desired for its subsequent operation.

The conveyor system continues with a second conveyor section 20 which extends through the shaping and quenching station 14. The second conveyor section 20 incorporates additional continuous rolls 19 fore and aft a plurality of stub rolls 21. A motor M-2 operates the second conveyor section 20 at a relatively high speed intermittently in a manner to be described in greater detail subsequently. An overrunning clutch arrangement (not shown) selectively couples the last six rolls of the first conveyor section 18 to the motor M-2. This enables the last six rolls to rotate normally at the speed of the first conveyor section 18 except when the second conveyor section 20 is actuated. In the latter case, the last six rolls of the first conveyor section 18 rotate at the faster intermittent speed of the second conveyor section 20.

The conveyor system 11 concludes with a third conveyor section 22 which extends through the additional cooling apparatus 16 and the unloading station which is not shown. The third conveyor section 22 comprises a motor M-3 driving a series of continuous, horizontally spaced, transversely extending rolls 23 to rotate the latter so that they propel a series of bent glass sheets to an unloading station (not shown).

The entire conveyor system 11 is supported on a framelike conveyor support structure 24 which includes bearing support beams 25 extending horizontally in spaced parallel pairs on the outer lateral sides of furnace 12 and the shaping and quenching station 14 and the additional cooling apparatus 16. The bearing support beams 25 in turn are supported on spaced vertical legs 26.

A glass sensing device, comprising a source of light 27 disposed on one side of the conveyor and a photosensitive device 28 adapted to produce a signal in response to light of a certain intensity disposed on the other side of the conveyor, is located before the exit of the furnace 12 in position to detect the presence or absence of a glass sheet G. The glass sensing device is constructed to impart an electrical signal when the leading edge of a glass sheet G passes between light source 27 and photosensitive device 28.

The furnace 12 may either be of the electric resistance type or of the gas burner type or one using a combination of gas and electric heaters. Provision is made for adjusting the intensity of heat radiated from each of the individual heaters 17 disposed in facing relation to the path of travel of glass sheets along the first conveyor section 18 so as to have the sheet arrive at the shaping and quenching station 14 at the desired deformation temperature.

All the rolls in the conveyor system are one inch diameter stainless steel shafts extending horizontally transversely of the conveyor system and are spaced longitudinally along the conveyor path. All the rolls except the stub rolls 21 are mounted on three inch centers. The stub rolls are spaced six inches lengthwise of the conveyor from one another and from the adjacent continuous rolls. In order to prevent the glass sheets from being subject to loss by "chill cracking," the conveyor rolls outside the furnace 12 are covered with stretched, braided fiber glass sleeves having a nominal diameter of ¾ inch and stretchable to fit snugly over the conveyor roll which it covers.

A preferable mode of operation of the furnace is to have the upper heaters 17 radiate heat downward more intensely onto the upper major surface of the glass sheets G conveyed along the first conveyor section 18 than the lower heaters radiate heat upward onto the lower major surface of the moving glass sheets. Such a disposition tends to warp the sheets into a slightly domed configuration so that the glass sheets make contact with the conveyor rolls only along their longitudinal side edges as depicted in U.S. Pat. No. 3,245,772 to James H. Cypher and Charles R. Davidson. This technique keeps the rolls from marking the viewing portions of the glass sheets that are treated. The upper and lower heating elements 17 in the furnace are energized to provide a heating pattern having a temperature gradient decreasing from the longitudinal center to each side thereof as well as a top to bottom difference to differentially heat the glass sheets passing through the furnace.

The shaping and quenching apparatus at the shaping and quenching station 14 is supported on a support frame generally depicted by reference number 30. The support frame comprises an upper horizontal frame 32 and a lower horizontal frame 34. A plurality of vertical members 36 interconnect the upper and lower frames to form a unitary structure. A lower piston housing 38 having an upwardly extendable piston 39 has its free end attached to a platform connected to the lower end of a lower mold 40.

The mold 40 comprises an upper foraminous contoured wall 41 forming the roof of a chamber 42. Clearance notches 43 are provided along opposite sides of the chamber 42 for purposes to be explained later. The foraminous wall 41 is contoured to provide an upward facing shaping surface conforming to the shape to be imparted to the lower major surface of the glass sheet.

Wall 41 is preferably convex so that the bent glass is shaped to have its viewing area out of contact with any conveyor rolls.

In order to keep the lower mold 40 in proper alignment and moving in a vertical axis of movement, a plurality of vertical sleeves 44 interconnected by reinforcements 45 are provided to receive guide rods 46 extending downward from the rear of the platform supporting the lower mold 40.

The lower piston 39 is constructed and arranged with respect to the lower mold 40 in such a manner that in its retracted position, the upper foraminous contoured wall 41 of the lower mold 40 lies entirely below the horizontal plane tangential to the upper extremity of stub rolls 21. This provides clearance for a glass sheet G to enter or leave the shaping station 14.

The notches 43 are aligned with the stub rolls 21. Their size permits the lower mold 40 to be moved upward into a position wherein its curved shaping surface formed at the upper surface of the foraminous contoured wall 41 lies above the horizontal support plane provided by stub rolls 21. The lower piston 39, when extended, lifts the shaping surface of the lower mold above the stub roll support plane.

A lug 47 is carried by the lower mold 40. A pair of limit switches LS–1 and LS–2 are supported in position for actuation by the lug 47 during certain movements of the lower mold 40 during a press bending operation as will be explained in greater detail later .

The pressing station 14 also comprises an upper piston housing 48 carried by the upper horizontal frame 32. An upper piston 49 is movable within the upper piston housing 48 and is attached at its lower end to an upper mold 50. The latter comprises a lower foraminous contoured wall 51 whose lower surface conforms to the shape desired for the upper surface of the glass sheet to be shaped. The upper mold 50 also comprises a hollow chamber 52, similar to chamber 42 for the lower mold 40. In addition, the upper mold may also have clearance notches 53, if desired. The notches 53 are aligned with the notches 43 of the lower mold 40, if present.

It is important that the upper mold 50 move in a vertical direction along an axis parallel to the axis of movement of the lower mold 40. Consequently, brackets 54 depending from the upper horizontal frame 32 are provided with apertured ears 55 which serve as sleeves to guide the movement of guide rods 56. The latter are attached to the rear of the upper molds 50.

In order to provide hot gas at certain phases of the operation and cold air at other phases of the operation, a hot gas supply pipe 57 is connected to the chamber 52 for the upper mold 50 and an additional hot gas supply pipe 58 is connected to supply hot gas into chamber 42 of the lower mold 40. An oven 59 serves as a source for hot gas which is delivered as desired through a solenoid valve SV–1 and the hot gas supply pipe 58 to the lower mold chamber 42 and through another solenoid valve SV–2 and hot gas supply pipe 57 to the upper mold chamber 52. Both hot gas supply pipes are flexible, and may supply the chambers from furnace 12.

A compressor or other source of cold air 60 is connected through still another solenoid valve SV–3 to flexible cold air supply pipes 61 and 62. The cold air supply pipes 61 supply cold air under pressure to the lower mold chamber 42 and flexible cold air supply pipes 62 supply cold air under pressure to the upper mold chamber 52 whenever solenoid valve SV–3 is open.

A spring 63 is entrained about each of the guide rods 56 and extends between a bracket 64 at its lower end and an apertured frame 65 at its upper end. When the upper mold 50 is retracted sufficiently to have the apertured frame 65 came into contact with the apertured ears 55, the springs 63 provide resilient resistance to further upward movement of the upper mold 50. Cross braces 66 extending generally horizontally in a horizontal plane below that occupied by the upper horizontal frame 32 of the support frame 30 interconnect the brackets 54 and also provide additional support for the lower end of the upper piston housing 48. The upper mold 50 is attached to the lower end of the upper piston 49 to cause the upper mold 50 to move downward in response to extension of the upper piston 49 in a downward direction and upward in response to retraction of the upper piston 49.

The foraminous contoured walls 41 and 51 are made of a refractory material, preferably one having a coefficient of heat conductivity between 3 and 5 British thermal units per hour per square foot of area per degree Fahrenheit difference per inch of thickness. A refractory material having about 99 percent by weight in a heat resistant binder sold by the trade name of "Glass Rock" and another sold under the trade name of "Masrock" are suitable materials. Another suitable material is an asbestos cement board sold under the trade name of "Transite."

The wall material is ground to the desired curvature and drilled to produce apertured pressing faces. The apertures 67 of the illustrative embodiment are ⅛ inch diameter holes arranged in oblique rows spaced apart ½ inch from each adjacent aperture. The apertures through the contoured walls 41 and 51 extend substantially normal to the walls. Additional apertures 68 (FIG. 9) extend diagonally through the walls formed by the notches 43 and 53 to insure that the entire glass sheet is exposed to successive baths of fluid that are as uniform as possible for the glass sheet before quenching and provide a uniform rate of chilling during quenching.

The chambers 42 and 52 are of metal and are secured to the marginal portion of the refractory walls 41 and 51 in any suitable manner. FIG. 9 illustrates one example of attachment by recessed screws.

The upper mold 50 also supports a glass reciprocating mechanism attached by lugs 70 for movement with piston 49. The glass reciprocating mechanism comprises a cylinder housing 71 supporting a piston 72 for extension in one direction horizontally and another housing 81 (FIG. 3) supporting a piston 82 for extension in the opposite horizontal direction. Attached to the free end of the piston 72 is a vertical finger 74. The latter is attached at its lower end to a horizontal bar 76. A similar finger 84 and horizontal bar 86 are similarly attached to piston 82. Pistons 72 and 82 are alternately extended to reciprocate the horizontal bars 76 and 86. A pair of horizontal arms 77 and 87 are attached to the longitudinal extremities of the horizontal bars 76 and 86 and extend at right angles to the horizontal bars. Vertical arms 78 and 88 having glass engaging fingers 79 and 89 at their lowermost ends are attached and extend downward from the horizontal arms 77 and 87. The arms 78 and 88 and fingers 79 and 89 are disposed in locations to reciprocate within the clearance notches 53 for the upper mold 50. The fingers 79 and 89 are usually arranged in sets so that there is one pair of opposite fingers 79 and 89 for each notch 53, although two pairs of spaced fingers suffice for many glass sizes. The fingers 79 and 89 opposite one another are spaced apart about ¼ inch more than the corresponding dimension of the glass sheet G. Suitable control circuitry will be described later to explain how the glass reciprocator apparatus works in timed sequence to the other operations of the press bending apparatus.

The apparatus of the illustrative embodiment also incorporates a transfer carriage or shuttle car 90 that transfers a bent glass sheet from the shaping and quenching station 14 to a position along the third conveyor section 22. However, the shuttle car is not necessary in cases where production requirements are such that the bent glass may be subjected to a longer period of quenching with chilling fluid at the shaping station. In such cases, the bent glass sheet G is deposited onto the stub rolls 21 of the conveyor and the latter rotated to remove the bent glass from the shaping and quenching station 14 to the additional cooling station 16.

The third conveyor section 22 extends through an additional cooling station 16 where the bent glass is cooled to a lower temperature than that at which it leaves the shaping station 14. To accomplish this end, the additional cooling station 16 is provided with an upper plenum chamber 91 and a lower plenum chamber 92 disposed above and below the plane of support provided by the conveyor rolls 23. The plenum chambers are carried in an enclosed housing and have openings, preferably in the form of spaced, opposed slots extending transverse to the path of glass sheet movement along the upper tangential plane common to the conveyor rolls 23.

The shuttle car 90 is of open frame construction and comprises two opposed longitudinally extending rod members 93 and 94, each supporting a pair of apertured bracket members 95 and 96, respectively. The latter, in turn, support depending wall members 97 and 98, respectively. Each wall member 97 and 98 supports a piston cylinder 99. Each of the latter has a piston 100 provided with a glass engaging finger 102 at its freen end. All four fingers 102 are extended simultaneously through notches 43 when the lower mold 40 engages a glass sheet against the upper mold 50 during press bending. Thus, when the lower mold 40 retracts, the glass sheet G is deposited on the extended fingers 102.

The longitudinally extending rod members 93 and 94 extend horizontally for a major portion of their length, then are curved upward and obliquely rearward toward one another until they meet at a bracket 104 to which they are connected rigidly. The bracket is attached to a drive belt 106 entrained upon a driving rod 107 and a driven rod 108. The latter rods are rotatably supported in brackets 109 and 110. A reversing motor 111, mounted on bracket 109, actuates the drive belt 106 through pulleys fixed to the rods 107 and 108. A limit switch LS–3 is positioned for actuation by bracket 104 whenever the shuttle car 90 reaches its rearmost position.

OPERATION

Glass sheets G are mounted in series and conveyed through the furnace 12 along the rollers 19 of the first conveyor section 18 at a speed synchronized with the intensity of heat radiated by the furnace heating elements 17 so that the glass sheet reaches the shaping and quenching station 14 at a temperature sufficient for rapid deformation and tempering.

The glass sensor 27, 28 detects the leading edge of a glass sheet G shortly before the latter leaves the furnace 12. At this stage, the output circuit of the glass sensor 28 actuates a conveyor clutch timer that engages the conveyor clutch for a predetermined time to rotate the last six rolls of the first conveyor section 18 together with the rolls of the high speed second conveyor section and closes solenoid valves SV–1 and SV–2, thus shutting off the flow of hot fluid into chambers 42 and 52.

FIG. 4 shows a glass sheet G arriving at the shaping station 14 with the shaping molds 40 and 50 retracted. The schematic views of FIGS. 4 to 8 exaggerate the mold spacing. Actually, the maximum mold separation need not exceed 1 inch for handling the usual variety of glass thicknesses usually processed (thicknesses up to a nominal ¼ inch thickness).

The molds are at a temperature within a temperature range such that the heat transfer rate between the hot mold and the glass sheet is approximately uniform throughout the entire extent of the glass sheet G. A preferable temperature range for the mold shaping surfaces is between 600 and 750 degrees Fahrenheit. When the contoured, foraminous mold walls are in this temperature range, the heat transfer rate of the glass portions facing the foramina of the contoured mold walls approximates that of the glass portions coming in direct contact with the shaping surfaces of the contoured molds.

The glass sensor 28 also actuates a timer circuit T–1 which extends the lower piston 39 upwardly and the upper piston 49 downwardly for a limited time sufficient to have the lower mold 40 lift the glass sheet G above the stub rolls 21 and into engagement with the lower surface of the upper mold 50. The springs 63 provide a resilient backing for the upper mold in case a glass sheet of excessive thickness is treated. FIG. 5 shows the glass sheet G sandwiched between the molds during its shaping.

As the lower mold 40 rises, its lug 47 trips limit switch LS–1 to actuate a timer T–2. After a predetermined time delay sufficient for the molds to shape the glass sheet, the timer T–2 causes the upper mold piston 49 to retract a short distance. In addition, timer T–2 opens the solenoid valve SV–1 to supply hot fluid to the lower mold chamber 42. The upward flow of hot fluid through the foramina or apertures 67 and 68 of the contoured upper wall 41 of the lower shaping mold 40 with the upper mold 50 retracted helps remove the bent glass sheet G from its embrace with the lower mold 40. Hot fluid is preferably supplied at a rate of between 300 and 350 cubic feet per minute of the combustion products of natural gas per square foot of commercial plate, sheet or float glass of soda-lime-silica composition.

Timer T–2 also activates a timer T–3, which stops the retraction of the upper mold piston 49 after a predetermined time interval so that the upper and lower molds are separated by a desired distance. This distance is preferably about 0.3 to 0.4 inch plus the glass thickness. (About .45 inch separation is suitable for glass sheets of ⅛ inch nominal thickness and about .6 inch separation is suitable for glass sheets of 3/16 inch nominal thickness.) At the same time that the upper mold movement stops, the glass is floating between the molds as shown in FIG. 6 and timer T–3 actuates a timer T–4.

Timer T–4 immediately closes solenoid valve SV–1 to cut off the supply of hot fluid to the lower mold chamber 42 and opens solenoid valve SV–3 to supply cold fluid under pressure to both mold chambers 42 and 52. Preferably the rate of cold air flow is between 2000 and 2500 cubic feet per minute per square foot for ⅛ inch thick glass and between 1300 and 1500 cubic feet per minute per square foot for 3/16 inch glass. These values are expressed for commercial plate, sheet or float glass of soda-lime-silica composition.

Also, timer T–4 starts the operation of a multivibrator circuit MV that is preferably set for 60 cycles per minute. The multivibrator alternately actuates the oppositely disposed pistons 72 and 82 to cause the glass engaging fingers 79 and 89 to reciprocate, thereby imparting linear reciprocating movement to the bent glass sheet while the latter floats on a cold air cushion formed from blasts through the foramina 67 and 68 of the contoured, foraminous walls 41 and 51 of the respective shaping molds 40 and 50. FIG. 7 shows this step. The curved sheets float in a curved path parallel to the mold contours with fingers 79 and 89 engaging opposite edges alternately.

In addition, timer T–4 actuates a timer T–5 that extends the shuttle car fingers 102 by actuating the four pistons 100 simultaneously. After a preset time, timer T–5 closes solenoid valve SV–3 to cut off the supply of cold fluid to the mold chambers 42 and 52, thereby permitting the bent glass sheet to lower itself onto the extended fingers 102. At the same time, timer T–5 disconnects the multivibrator circuit MV to discontinue operation of the glass reciprocator and completely retracts the mold pistons 39 and 49.

The lower mold 40, on retraction with the lower mold piston 39, causes lug 47 to trip limit switch LS–2. The latter, in turn, actuates motor drive 111 to transfer the shuttle car 90 from a position where fingers 102 are disposed in alignment above the mold notches 43 to a position beyond the shaping station 14 where bracket 104 engages limit switch LS–3. When the shuttle car moves to this latter position, its extended fingers 102 support the bent glass sheet G for displacement from the bending and quenching station 14 to the additional cooling station 16. FIG. 8 shows how the fingers 102 support the bent glass G for removal from station 14.

When limit switch LS-3 is engaged, it deactivates the pistons 100, thereby permitting them to retract the fingers 102. This action deposits the bent glass sheets onto the conveyor rolls 23 of the third conveyor section 22. At the same time, limit switch LS-3 actuates a timer T-6 that energizes the motor drive 111 in reverse until the shuttle car 90 is in position at the shaping and quenching station 14 with its fingers 102 retracted, but capable of alignment with the notches 43 and 53 of the shaping molds 40 and 50 upon extension.

The timer T-6 also resets all the limit switches and timers so that they can be actuated in the sequence recited above during a succeeding cycle. In addition, timer T-6 opens solenoid valves SV-1 and SV-2 to permit heated gas to enter mold chambers 42 and 52 to raise the mold temperatures to the desired temperature range. The rate of flow is again preferably between 300 and 350 cubic feet per minute of the combustion products of natural gas per square foot of mold shaping surface. This rate suffices to raise the molds to the desired temperature range of 600 to 750 degrees Fahrenheit without wasting excess combustion products.

It is understood that the present invention may be used in horizontal pressing apparatus comprising one mold of the type depicted by convex mold 40 in combination with an open ring type mold. Preheating a foraminous mold to the proper temperature range causes equal heat exchange along opposite major glass sheet surfaces even though one mold is continuous and the other of the open ring type.

Several experiments were performed to determine optimum parameters for quenching pressed glass sheets. In these experiments, apertures 67 were arranged in parallel rows ½ inch apart. The apertures in each row were ⅛ inch diameter spaced ½ inch apart center to center and the rows were skewed at a 15 degree angle to the axis of relative movement between the glass sheet and the press bending molds.

The following parameters listed in Table I were verified as the minimum quenching times and minimum displacement at 60 cycles of reciprocation per minute to establish an acceptable temper in the glass previously heated to 1220 degrees Fahrenheit before being press bent and quenched (one in which the glass developed a surface compression stress of at least 22,000 pounds per square inch).

TABLE I

| Glass | Nominal thickness, inches | Mold to mold separation, inches | Minimum acceptable displacement, inches | Minimum time to produce acceptable temper, seconds |
|---|---|---|---|---|
| Sheet | ⅛ | .45 | ⅝ | 5 |
| Sheet | 3/16 | .55 | ⅝ | 7 |
| Plate | ¼ | .65 | ⅝ | 9 |

Previous work on glass tempering had indicated that commercial soda-lime-silica composition of sheet glass, plate glass and float glass had insignificant differences from one another in parameters for identical thicknesses, heating cycles, nozzle or aperture configurations, mold to mold separation during quenching, rate of cold air flow and displacement during relative oscillation between the bent glass and the apertured molds during quenching.

The form of the invention shown and described in this disclosure represents an illustrative preferred embodiment thereof. It is understood that various changes may be made without departing from the spirit of the invention as defined in the claimed subject matter which follows. For example, an operative apparatus may have only the lower mold 40 movable vertically instead of moving both molds of the illustrative horizontal press bending apparatus.

What is claimed is:

1. A method of shaping and cooling a glass sheet disposed in a generally horizontal position at a desired location,
    press shaping said sheet to a desired curvature at said location with opposing foraminous surfaces,
    moving at least one of said foraminous surfaces to separate said foraminous surfaces, said glass sheet remaining in contact with one of said foraminous surfaces,
    applying heated fluid through said foraminous surface in contact with said glass sheet at a pressure sufficient to separate said glass sheet from said foraminous sheet in contact therewith, and
    applying chilling medium through each of said foraminous surfaces to said glass sheet at a pressure sufficient to support said glass sheet and until said glass sheet is no longer in a deformable state.

2. A method of shaping and cooling a glass sheet at a location in a generally horizontal path through which said glass sheet is conveyed comprising
    moving said sheet into said location,
    press shaping said sheet to a desired curvature at said location with opposing foraminous surfaces,
    moving at least one of said foraminous surfaces to separate said foraminous surfaces, said glass sheet remaining in contact with one of said foraminous surfaces,
    applying heated air through said foraminous surface in contact with said glass sheet at a pressure sufficient to separate said glass sheet from said foraminous surface in contact therewith, and
    applying cool air through each of said foraminous surfaces to said glass sheet at a pressure sufficient to support said glass sheet and until said glass sheet is no longer in a deformable state.

3. Apparatus for bending and cooling glass sheets, comprising a press shaping mold and a light weight frame at a single station, a pair of sets of fingers fixed to said frame for movement therewith, each finger of one set being spaced from a finger of the other set by a distance slightly greater than the glass sheet dimension along a line connecting said fingers, means supporting said frame relative to said mold, and means to impart a to-and-fro motion to said frame in a generally horizontal direction and along an axis parallel to said line connecting said fingers, whereby when a bent glass sheet is supported adjacent a shaping surface of said mold, said fingers alternately engage opposite edges of said supported glass sheet to impart a generally horizontal to-and-fro motion to said supported glass sheet until said glass sheet is cooled and is no longer in a deformable state.

4. Apparatus as in claim 3, comprising a pair of press shaping mold members, each mold member having a plenum chamber and an outer, foraminous wall having a contour conforming to the shape desired for the major surface of a glass sheet it opposes during press bending, means for introducing cold fluid into said chamber for exhaust through said foramina at a rate sufficiently rapid to impart a temper to said glass sheet after the latter is shaped to its desired contour, and means to actuate said to-and-fro motion of said frame in synchronism with the introduction of cold fluid into said chambers.

5. Apparatus as in claim 4, wherein said molds include one mold having a foraminous wall of concave contour and another mold having a foraminous wall of convex contour and means providing relative movement between said contoured walls between a retracted position and a closed position.

6. Apparatus as in claim 5, further including control means for introducing fluid into the chamber of said mold having a foraminous wall of convex contour only upon providing relative movement of said molds from said closed position to help disengage said bent glass sheet from said molds.

7. Apparatus as in claim 5, wherein said molds comprise an upper mold and a lower mold disposed above and below one another and said frame is supported for movement on said upper mold and is provided with a clearance notch to receive each of said fingers.

8. Apparatus as in claim 7, wherein said lower mold is provided with a clearance notch aligned with each of said clearance notches provided on said upper mold.

9. Apparatus as in claim 8, further including a horizontal conveyor including stub rolls aligned with said clearance notches on said lower mold.

10. Apparatus as in claim 7, wherein said upper mold has a downwardly facing, concave, foraminous wall recessed upward from a horizontal plane and said lower mold has an upwardly facing, convex, foraminous wall protruding upward from a horizontal plane.

11. The method of claim 2 wherein said cool air applied to said glass sheet is applied at a rate and at a temperature sufficient to temper said glass sheet.

12. A method of shaping and cooling a glass sheet disposed in a generally horizontal position at a single station,
press shaping said sheet to a desired curvature at said station with opposing foraminous surfaces,
moving at least one of said foraminous surfaces to separate said foraminous surfaces, said glass sheet remaining in contact with one of said foraminous surfaces,
applying fluid through said foraminous surface in contact with said glass sheet at a pressure sufficient to separate said glass sheet from said foraminous surface in contact therewith,
engaging opposite edges of said glass sheet and
applying reciprocating forces at said station in a generally horizontal direction to the opposing edges of said sheet at the points of engagement therewith, said forces being sufficient to impart reciprocating movement to said glass sheet in opposite generally horizontal directions and until said glass sheet is no longer in a deformable state.

13. A method of shaping and cooling a glass sheet at a single station in a generally horizontal path through which said glass sheet is conveyed comprising
moving said sheet into said station,
press shaping said sheet to a desired curvature at said station with opposing foraminous surfaces,
moving at least one of said foraminous surfaces to separate said foraminous surfaces, said glass sheet remaining in contact with one of said foraminous surfaces,
applying fluid through said foraminous surface in contact with said glass sheet at a pressure sufficient to separate said glass sheet from said foraminous surface in contact therewith,
engaging opposite edges of said glass sheet and
applying reciprocating forces at said station in a generally horizontal direction to the opposing edges of said sheet at the point of engagement therewith, said forces being sufficient to impart reciprocating movement to said glass sheet in opposite generally horizontal directions and until said glass sheet is no longer in a deformable state.

14. A method of shaping and cooling a glass sheet at a single station in a generally horizontal path through which said glass sheet is conveyed comprising
moving said sheet into said station,
press shaping said sheet to a desired curvature at said station with opposing foraminous surfaces,
moving at least one of said foraminous surfaces to separate said foraminous surfaces, said glass sheet remaining in contact with one of said foraminous surfaces,
applying fluid through said foraminous surface in contact with said glass sheet at a pressure sufficient to separate said glass sheet from said foraminous surface in contact therewith,
applying chilling medium through each of said foraminous surfaces to said glass sheet at a pressure sufficient to support said glass sheet,
engaging opposite edges of said glass sheet while said sheet is so supported, and
applying reciprocating forces at said station in a generally horizontal direction to the opposing edges of said sheet at the points of engagement therewith while said chilling medium is applied through each of said foraminous surfaces to said glass sheet, said forces being sufficient to impart reciprocating movement to said glass sheet in opposite generally horizontal directions, said chilling medium and said forces being applied to said glass sheet until said sheet is no longer in a deformable state.

15. The method of claim 14 wherein said chilling medium applied to said glass sheet is applied at a rate and at a temperature sufficient to temper said glass sheet.

16. An apparatus for shaping and cooling a glass sheet as in claim 14 further comprising
a pair of press shaping mold members, each of said members having opposing foraminous shaping surfaces and a plenum means for supplying a gas through the foramina of each of said foraminous members,
means for moving one of said mold members to separate the foraminous surfaces of said mold members,
means for supplying a heated gas to at least one of said plenum chambers and
means for supplying a cooled gas to each of said plenum chambers.

17. A method of shaping and cooling a glass sheet at a single station in a generally horizontal path through which said glass sheet is conveyed comprising
moving said sheet into said station,
press shaping said sheet to a desired curvature at said station with opposing foraminous surfaces,
moving at least one of said foraminous surfaces to separate said foraminous surfaces,
applying chilling medium through each of said foraminous surfaces to said glass sheet at a pressure sufficient to support said glass sheet, engaging opposite edges of said glass sheet while said sheet is so supported, and
applying reciprocating forces at said station in a generally horizontal direction to the opposing edges of said sheet at the points of engagement therewith while said chilling medium is applied through each of said foraminous surfaces to said glass sheet, said forces being sufficient to impart reciprocating movement to said glass sheet in opposite generally horizontal directions, said chilling medium and said forces being applied to said glass sheet until said sheet is no longer in a deformable state.

References Cited

UNITED STATES PATENTS

| | | | |
|---|---|---|---|
| 3,279,906 | 1/1966 | Baker | 65—275X |
| 3,468,645 | 9/1969 | McMaster et al. | 65—182X |
| 3,485,612 | 12/1969 | McMaster | 65—182X |
| 3,488,173 | 1/1970 | McMaster | 65—182X |

ARTHUR D. KELLOGG, Primary Examiner

U.S. Cl. X.R.

65—106, 273, 275, 289